United States Patent
Nagase (10) Patent No.: US 6,972,537 B2
(45) Date of Patent: Dec. 6, 2005

(54) ELECTRIC POWER STEERING APPARATUS

(75) Inventor: Shigeki Nagase, Mie (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 10/919,485

(22) Filed: Aug. 17, 2004

(65) Prior Publication Data
US 2005/0051379 A1    Mar. 10, 2005

(30) Foreign Application Priority Data
Aug. 18, 2003 (JP) .......................... P.2003-294656

(51) Int. Cl.$^7$ .................................................. H02P 7/00
(52) U.S. Cl. ...................... 318/432; 318/434; 318/632; 318/700
(58) Field of Search ........................................ 318/432

(56) References Cited

U.S. PATENT DOCUMENTS

| | | | |
|---|---|---|---|
| 5,461,293 A * | 10/1995 | Rozman et al. ............. | 318/603 |
| 6,411,057 B2 * | 6/2002 | Gotou ......................... | 318/599 |
| 6,427,104 B1 * | 7/2002 | Matsushita et al. ........... | 701/41 |
| 6,687,589 B2 * | 2/2004 | Kanda ......................... | 701/41 |
| 6,727,669 B2 * | 4/2004 | Suzuki et al. ................ | 318/139 |
| 6,845,305 B1 * | 1/2005 | Raftari et al. ................. | 701/22 |
| 6,915,194 B2 * | 7/2005 | Kodama et al. .............. | 701/41 |
| 2002/0166716 A1 | 11/2002 | Shimizu et al. | |

FOREIGN PATENT DOCUMENTS

| | | |
|---|---|---|
| EP | 1 134 146 A | 9/2001 |
| JP | 8-119132 | 5/1996 |
| JP | 11-180320 | 7/1999 |

* cited by examiner

*Primary Examiner*—Kimberly Lockett
*Assistant Examiner*—Erick Glass
(74) *Attorney, Agent, or Firm*—McGinn IP Law Group, PLLC (57) ABSTRACT

Current detecting circuits are provided for all phases of a motor driving circuit. A motor control portion is provided with a correction value calculating unit for calculating a correction value by dividing a total sum of motor current values based on detecting signals detected by the current detecting circuits of all the phases by a number of the phases of a motor and a motor current value correcting unit for correcting the motor current values by subtracting the correction value from the motor current values based on values of currents actually flowing in the respective phases of the motor. Thereby, the motor is driven.

2 Claims, 6 Drawing Sheets

FIG. 6

# ELECTRIC POWER STEERING APPARATUS

BACKGROUND OF THE INVENTION

The present invention relates to an electric power steering apparatus, particularly relates to an electric power steering apparatus for applying a steering assisting force to a steering mechanism of a vehicle by a brushless motor.

In a related art, an electric power steering apparatus is used for applying a steering assisting force to a steering mechanism by driving an electric motor in accordance with a steering torque applied to a handle (steering wheel) by a driver. The electric power steering apparatus is provided with a torque sensor for detecting the steering torque applied to the steering wheel which is an operating device for steering, and a target value of current (hereinafter, referred to as "target current value") to be supplied to the electric motor is set based on the steering torque detected by the torque sensor. Further, an instruction value to be provided to a driving unit of the electric motors is generated by proportional integrating operation based on a deviation between the target current value and a value of current actually flowing in the electric motor. The driving unit for the electric motor is provided with a PWM signal generating circuit for generating a pulse width modulating signal (hereinafter, referred to as "PWM signal") having a duty ratio in accordance with the instruction value, and a motor driving circuit constituted by using a power transistor made to be ON/OFF in accordance with the duty ratio of the PWM signal, and applies voltage in accordance with the duty ratio to the electric motor. Current flowing in the electric motor by applying the voltage is detected by a current detecting circuit, and a difference between the target current value and the detected current value is used as the deviation for generating the above-described instruction value.

Figure 5:
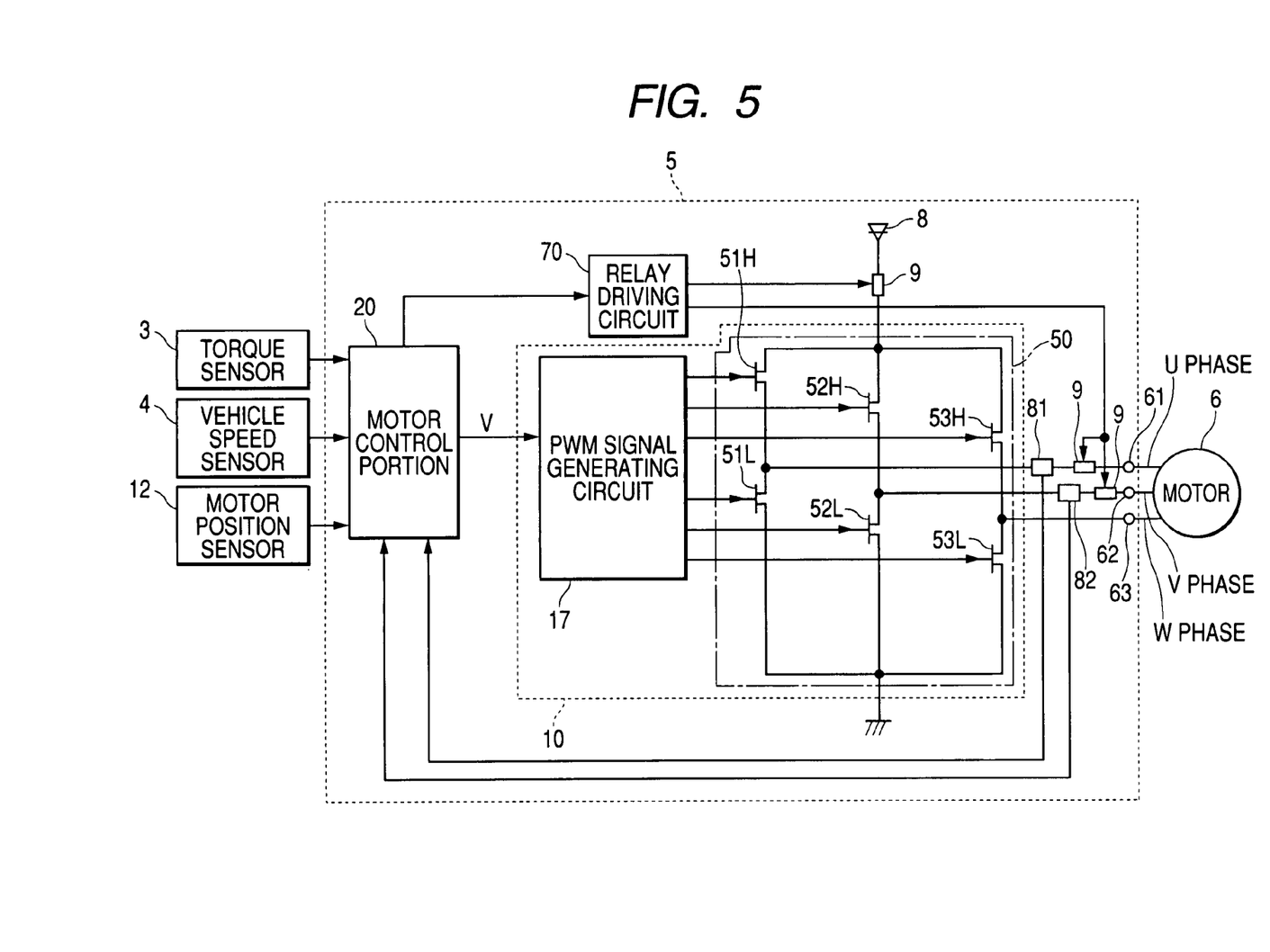
FIG. 5 is a block diagram showing a constitution of ECU which is a control apparatus of an electric power steering apparatus of a related art.

In recent years, such an electric power steering apparatus is employed in which a brushless motor is used as the electric motor. FIG. 5 is a block diagram showing a constitution of ECU 5 which is a control apparatus in the electric power steering apparatus of the related art in which a brushless motor of 3 phases is used. ECU 5 is provided with a motor control portion 20, a motor driving portion 10, a relay driving circuit 70, and current detecting circuits 81, 82. The motor driving circuit 10 is constituted by a PWM signal generating circuit 17 and a motor driving circuit 50.

As shown by FIG. 5, the motor driving circuit 50 is connected in series with FET (transistor effect type transistors) 51H through 53H arranged on a power source line side (side of a battery 8) and FET 51L through 53L arranged on a ground line side to constitute pairs respectively thereby and constituted by connecting in parallel with 3 pairs of the pairs of FET. Further, generally, in such a circuit, a circuit portion on the power source line side is referred to as "upper arm" and a circuit portion on the ground line side is referred to as "lower arm". Connection points of the upper arm and the Glower arm are respectively connected to motor terminals 61 through 63. In FIG. 5, the motor terminals 61, 62, 63 respectively indicate terminals of U phase, V phase, W phase. Further, the current detecting circuits 81, 82 are provided between the motor driving circuit 50 and a motor 6 with respect to U phase and V phase.

Figure 6:
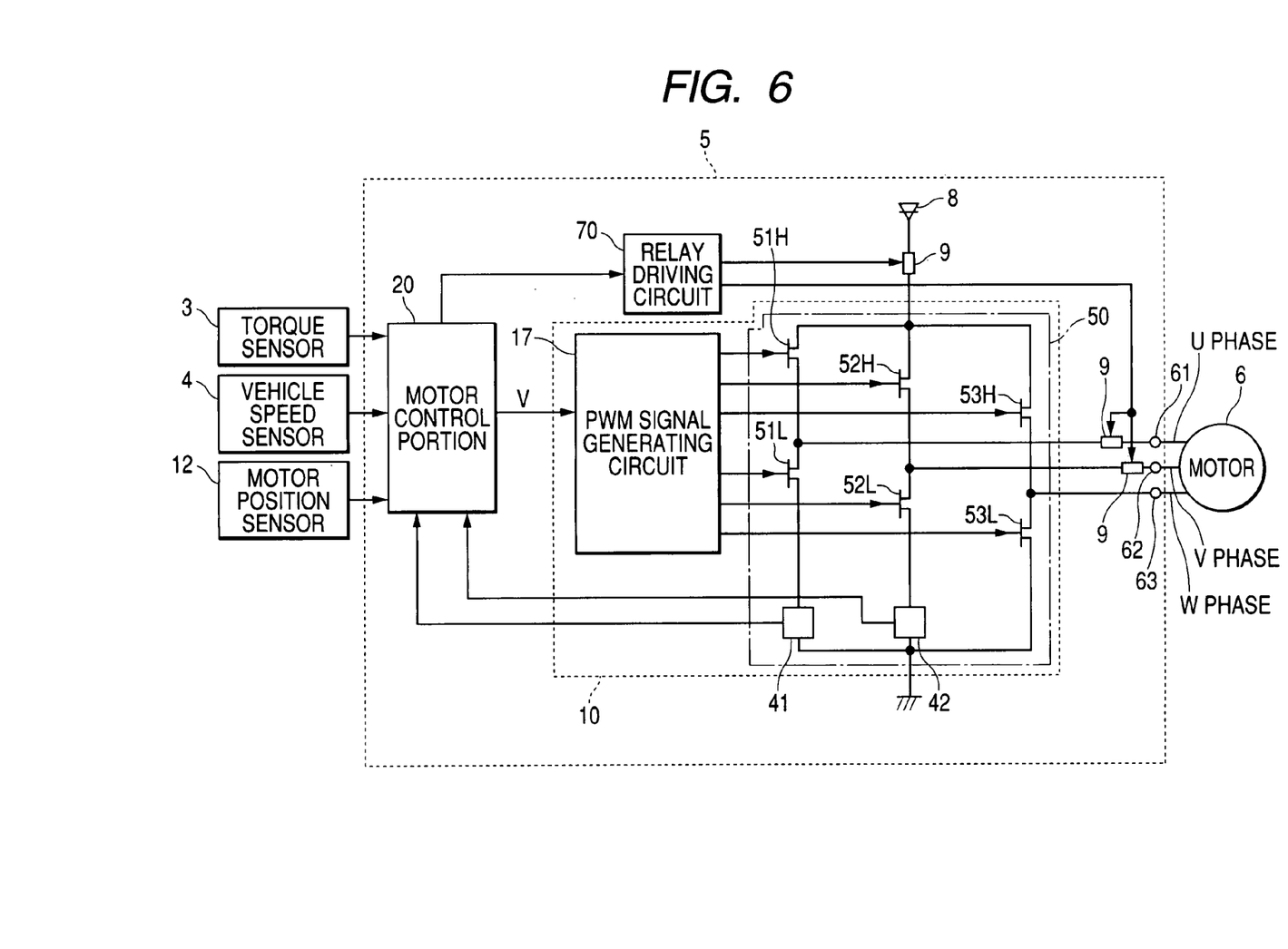
FIG. 6 is a block diagram showing a constitution of ECU which is a control apparatus of an electric power steering apparatus according to other related art.

FIG. 6 is a block diagram showing a constitution of ECU 5 which is a control apparatus of an electric power steering apparatus of other related art. Whereas in the related art shown in FIG. 5, the current detecting circuits 81, 82 are provided between the motor driving circuit 50 and the motor 6 for detecting currents flowing in the motor 6, according to an example shown in FIG. 6, in lower arms of U phase and V phase, current detecting circuits 41, 42 connected in series with FET 51L, 52L are respectively provided. The circuit is more simplified in the constitution shown in FIG. 6 than in the constitution shown in FIG. 5 and therefore, the constitution shown in FIG. 6 is general.

According to the constitution by the related art, the current detecting circuits are provided only at any 2 phases in 3 phases. According to the above-described constitution using the brushless motor of 3 phases, the currents flowing in the motor 6 become alternating currents in 3 phases, and a sum of values of the currents flowing in the respective phases becomes null. For example, when the current detecting circuits are provided at U phase and V phase as shown by FIG. 5 and FIG. 6, a value Iw of the current flowing in W phase is calculated by the following equation (1) based on a value Iu of the current flowing in U phase and a value Iv of the current flowing in V phase.

$$Iw = -(Iu+Iv) \quad (1)$$

Meanwhile, there is a case in which although the values of the currents to be made to flow in the motor become null, actually, the currents are detected in the current detecting circuit. Such current is referred to as offset current and in operating the motor, the detected current value detected by the current detecting circuit is the value of the current flowing in the motor superposed with a value of the offset current (hereinafter, referred to as "offset value"). According to the constitution by the above-described related art, when such offset current is generated, there is a case in which a torque ripple is generated by producing an error between a current to be made to flow to each phase of the motor inherently and a current made to flow to each phase of the motor actually. Hence, there is proposed an electric power steering apparatus for holding a detected current value detected by a current detecting circuit when an ignition switch is made ON as an offset correction value and correcting the detected value detected by the current detecting circuit based on the offset correction value in operating the motor (see JP-A-8-119132, for example).

According to the above-described constitution, since the offset value when the ignition switch is made ON is held, an influence by a characteristic of each current detecting circuit in starting to operate the electric power steering apparatus is corrected. However, in operating the electric power steering apparatus, the current detecting circuit is effected with an influence of a temperature change or the like and the offset value varies. After varying the offset value, an error is produced between a current to be made to flow to each phase of the motor inherently and a current made to flow in each phase of the motor actually and the torque ripple is brought about. Therefore, a driver may feel a strange feeling in operating the steering wheel.

SUMMARY OF THE INVENTION

Hence, it is an object of the invention to provide an electric power steering apparatus capable of making a driver feel a steering feeling having no strange feeling without generating a torque ripple even when a change in an environment of a change in temperature or the like is brought about in operating the electric power steering apparatus.

In order to solve the aforesaid object, the invention is characterized by having the following arrangement.

(1) An electric power steering apparatus for applying a steering assisting force to a steering mechanism of a vehicle by driving a brushless motor in accordance with a steering torque applied to an operating unit for steering the vehicle, the electric power steering apparatus including:

motor current detecting units provided at respective phases of the brushless motor, which detect values of motor currents flowing in the respective phases of the brushless motor and output detecting signals indicating the motor current values, respectively;

a correction value calculating unit that calculates a correction value for correcting the motor current values provided based on the detecting signals by dividing a sum of the motor current values of all the phases of the brushless motor by a number of the phases of the brushless motor;

a motor current value correcting unit that corrects the motor current values based on the correction value; and a motor driving unit that drives the brushless motor based on the motor current values corrected by the motor current value correcting unit.

(2) A method of driving a brushless motor in accordance with a steering torque applied to an operating unit for steering a vehicle to apply a steering assisting force to a steering mechanism of the vehicle, said method including the steps of:

detecting values of motor currents flowing in respective phases of the brushless motor;

calculating a correction value for correcting the motor current values provided based on a result of the detecting step by dividing a sum of the motor current values of all the phases of the brushless motor by a number of the phases of the brushless motor;

correcting the motor current values based on the correction value; and driving the brushless motor based on the corrected motor current values.

According to the invention, in all the phases of the brushless motor, the motor current values of the respective phases are calculated by the detected current values detected by the motor current detecting means provided at the respective phases. Therefore, an error by calculation is not brought about with regard to the motor current values of all the phases of the brushless motor. Further, amounts of varying offset values of the detected current values detected by the motor current detecting means provided at the respective phases of the brushless motor are calculated as the correction value for correcting the motor current values. Further, the motor current values for driving the brushless motor are corrected by the correction value. Therefore, even when a variation is produced in the offset value of the detected current values detected value of the motor current detecting means by a change in temperature or the like, the brushless motor is driven to compensate for the variation in the offset value. Thereby, even when a change in an environment is brought about, a torque ripple can effectively be restrained from being brought about.

DETAILED DESCRIPTION OF PREFERRED EMBODIMENTS

An embodiment of the invention will be described in reference to the attached drawings as follows.

<1. Total Constitution>

Figure 1:
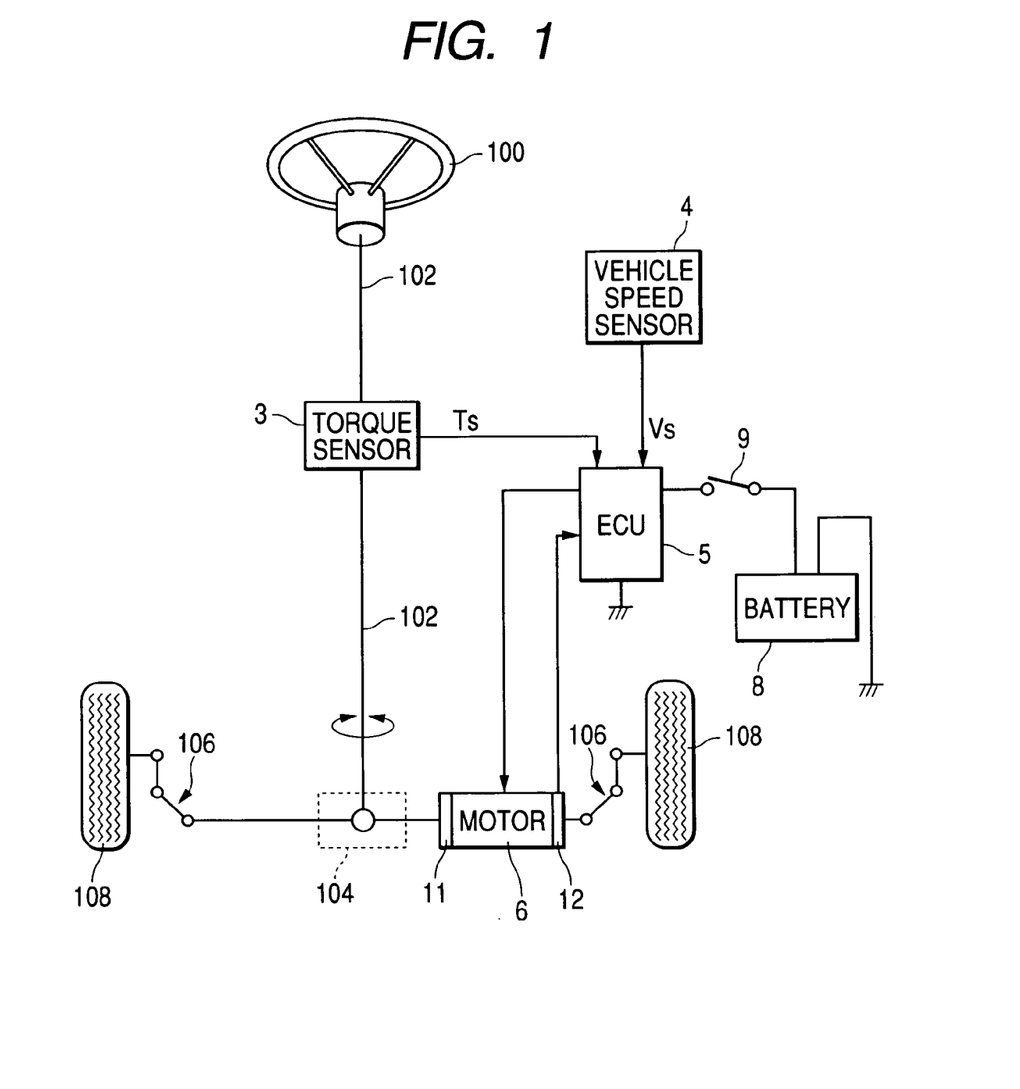
FIG. 1 is an outline view showing a constitution of an electric power steering apparatus according to an embodiment of the invention along with a constitution of a vehicle related thereto.

FIG. 1 is an outline view showing a constitution of an electric power steering apparatus according to an embodiment of the invention along with a constitution of a vehicle related thereto. The electric power steering apparatus is provided with a steering shaft 102 one end of which is fixedly attached to a steering wheel 100 as operating means for steering, a rack pinion mechanism 104 connected to other end of the steering shaft 102, a torque sensor 3 for detecting a steering torque Ts applied to the steering shaft 102 by operating the steering wheel 100, a vehicle speed sensor 4 for detecting a running speed Vs of the vehicle, a brushless motor 6 for generating a steering assisting force for alleviating a load of a driver, a ball screw driving portion 11 for transmitting the steering assisting force to a rack shaft, a motor position sensor 12 for detecting a rotational position of a rotor of the brushless motor 6, and an electronic control unit (ECU) 5 for controlling to drive the brushless motor 6 based on sensor signals from the torque sensor 3 and the vehicle speed sensor 4.

When the steering wheel 100 is operated by the driver, the brushless motor 6 is driven by ECU 5 based on the steering torque Ts detected by the torque sensor 3, the vehicle speed Vs detected by the vehicle speed sensor 4 and the rotational position of the rotor detected by the motor position sensor 12. Thereby, the brushless motor 6 generates the steering assisting force and the load of the driver is alleviated by applying the steering assisting force to the rack shaft via the ball screw driving portion 11. That is, the rack shaft is reciprocally moved by the steering torque Ts applied by operating the steering wheel and the steering assisting force generated by the brushless motor 6. Both ends of the rack shaft are connected to wheels 108 via connecting members 106 each comprising a tie rod and a knuckle arm and a direction of the wheel 108 is changed in accordance with the reciprocal movement of the rack shaft.

<2. Constitution of Control Apparatus>

Figure 2:
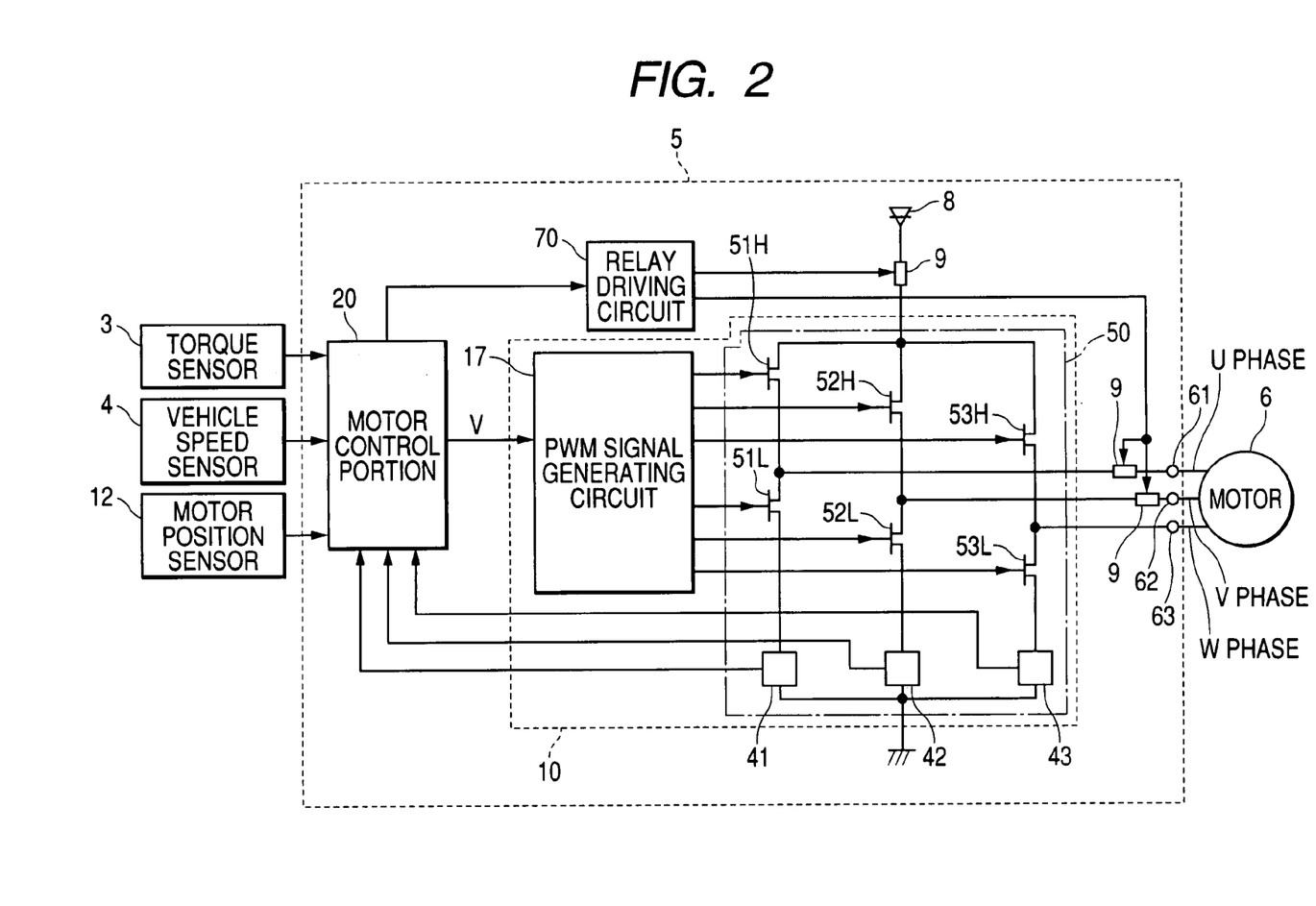
FIG. 2 is a block diagram showing a constitution of ECU which is a control apparatus of the electric power steering apparatus according to the embodiment.

FIG. 2 is a block diagram showing a constitution of ECU 5 which is a control apparatus of the electric power steering apparatus. ECU 5 is provided with the motor control portion 20, the motor driving portion 10 and the relay driving circuit 70. The motor control portion is constituted by a microcomputer and operated by executing a predetermined program stored to a memory. Motor driving portion 10 is constituted by the PWM signal generating circuit 17 and the motor driving circuit 50. The motor driving circuit 50 is constituted by connecting in series with FET 51H through 53H provided at respective lines of the upper arm and FET 51L through 53L provided at respective lines of the lower arm to constitute pairs respectively thereby and constituted by 3 phases connecting in parallel with the pairs of FET by 3 pairs.

Further, the respective connection points of the upper arms and the lower arms are connected to the terminals 61 through 63 of respective phases of the motor. Further, the current detecting circuits 41 through 43 connected in series with FET 51L through 53L of the lower arms are provided to all of 3 phases. The current detecting circuits 41 through 43 include shunt resistors and a U phase current detected value Iu, a V phase current detecting value Iv, and a W phase current detected value Iw are calculated based on voltages across both ends of the shunt resistors. Further, the current detected value calculated here includes the offset value.

The motor control portion 20 receives the steering torque detected by the torque sensor 3, the vehicle speed detected by the vehicle speed sensor and the phase current detected values Iu, Iv, Iw detected by the current detecting circuits 41 through 43 provided at the respective phases of the motor driving circuit 50. The motor control portion 20 calculates values of currents flowing in the respective phases of the motor 6 (hereinafter, referred to as "motor current values") by subtracting the offset value from the phase current detected values Iu, Iv, Iw. Further, a target value of a current to be made to flow to the motor 6 is determined based on the steering torque and the vehicle speed in reference to a table corresponding the steering torque and the target current value which is referred to as an assist map. Further, proportional integrating operation is carried out based on the deviation between the target current value and the motor current value to generate an instruction value V provided the PWM signal generating circuit 17. Further, the motor control portion 20 outputs a relay control signal for controlling the relay driving circuit 70 based on a detected result of a failure or the like. Further, a detailed explanation of calculating the motor current value and correcting the calculated motor current value will be given later.

In the motor driving portion 10, the PWM signal generating circuit 17 receives the instruction value V and generates a PWM signal a duty ratio of which is changed in accordance with the instruction value V. The motor 6 is driven by applying voltage to the motor 6 by the motor driving circuit 50.

The relay driving circuit 70 is operated based on the relay control signal outputted by the motor control portion 20. The relay driving circuit 70 maintains a relay 9 in a closed state and continues to supply power source to the motor driving portion 10 and the motor 6 until a signal indicating that a failure is detected is received from the motor control portion 20. When a failure is detected by a failure detecting processing in the motor control portion 20, the relay driving circuit 70 receives a signal indicating that a failure is detected from the motor control portion 20. Thereby, the relay driving circuit 70 brings the relay 9 into an open state and stops supplying power source to the motor driving portion 10 and the motor 6.

<3. Calculation and Correction of Motor Current Value>

Next, an explanation will be given of calculation of the motor current value and correction of the motor current value according to the embodiment. According to the embodiment, the U phase current detected value Iu, the V phase current detected value Iv, and the W phase current detected value Iw are detected by the current detecting circuits 41 through 43 provided at the lower arms of the respective phases of the motor 6. Further, the motor current value is calculated by subtracting the offset value from the phase current detected value for each phase.

Here, when the offset value produced by the current detecting circuits 41 through 43 is not varied in operating the electric power steering apparatus, even when the motor 6 is driven based on the motor current value calculated by subtracting the offset value from the phase current detected value, the torque ripple is not generated. However, as described above, the offset value produced in the current detecting circuits 41 through 43 is varied by an influence of a change in an environment of a change in temperature or the like in operating the electric power steering apparatus. Therefore, there is an error between the motor current value and a value of current made to flow in the motor 6 actually by an amount of varying the offset value (hereinafter, referred to as "offset varying value"). Thereby, the error is produced between current to be made to flow to each phase of the motor 6 inherently and current made to flow to each phase of the motor 6 actually and the torque ripple is generated. Hence, according to the embodiment, the motor current value is corrected based on the offset varying value.

In the brushless motor of 3 phases by Y connection, the sum of the motor current values made to flow in respective phases (U phase motor current value Imu, V phase motor current value Imv, W phase motor current value Imw) becomes null and when the offset value is not varied, the following equation (2) is established.

$$Imu+Imv+Imw=0 \qquad (2)$$

However, the offset value is varied as described above. Further, the current detecting circuits 41 through 43 provided at the respective phases are arranged to be proximate to each other and therefore, it seems that influences of changes in temperature or the like effected to respective phases are substantially equal. When an offset varying value produced at the current detecting circuit provided at a certain phase is designated by notation "a", the following equation (3) is established.

$$Imu+Imv+Imw=3a \qquad (3)$$

Hence, by correcting the motor current value by the offset varying value calculated based on the above equation (3), the actual motor current value (hereinafter, referred to as "corrected motor current value") is calculated. The motor 6 is driven based on the corrected motor current value.

Figure 3:
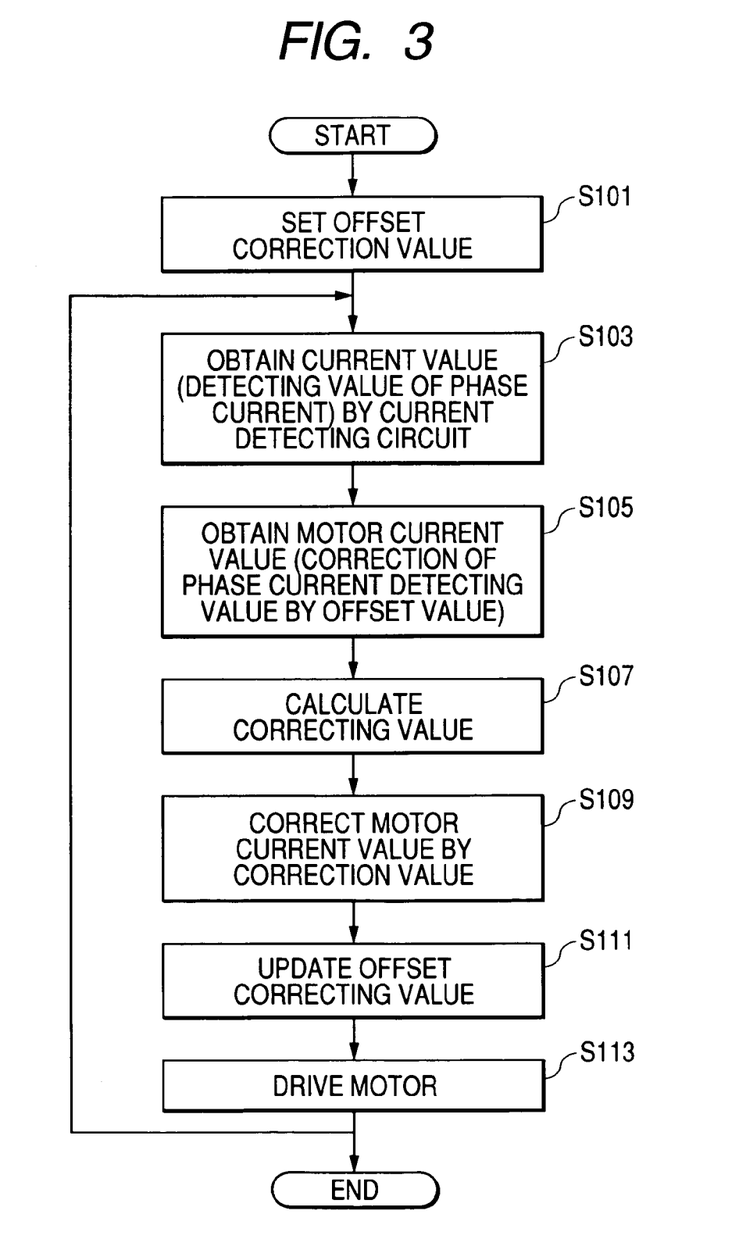
FIG. 3 is a flowchart showing a procedure of calculating a motor current value of a motor control portion according to the embodiment.

FIG. 3 is a flowchart showing a procedure of calculating a motor current value of the motor control portion 20 according to the embodiment. An explanation will be given in reference to FIG. 3 as follows.

In the electric power steering apparatus, when the ignition switch is made ON for acquiring an initial characteristic of the offset value produced at the respective current detecting circuits 41 through 43, the phase current detected values Iu, Iv, and Iw detected by the current detecting circuits 41 through 43 at the occasion are set as a U phase offset correction value Iou, a V phase offset correction value Iov, and a W phase offset correction value Iow (step S101).

At step S103, based on the detected signals outputted by the current detecting circuits 41 through 43, a U phase current detecting value Iu, a V phase current detected value Iv, and a W phase current detected value Iw are acquired. Further, at step S105, the U phase motor current value Imu, the V phase motor current value Imv, and the W phase motor current value Imw are calculated by subtracting the U phase offset correction value Iou, the V phase offset correction value Iov, and the W phase offset correction value Iow respectively from the U phase current detected value Iu, the V phase current detected value Iv, and the W phase current detected value Iw.

At step S107, a correction value for correcting the U phase motor current value Imu, the V phase motor current value Imv, and the W phase motor current value Imw calculated at step S105. Since according to the embodiment, the brushless motor of 3 phases is used, a correction value Iho is calculated by dividing a sum of the motor current values Imu, Imv, and Imw of respective phases by 3 (number of phases) as shown by the following equation (4).

$$Iho = (Imu + Imv + Imw)/3 \qquad (4)$$

Further, a correction value calculating unit is realized by the step S107.

At step S109, the motor current value is calculated at step S105 is corrected. Specifically, as shown by the following equations (5) through (7), the correction value Iho calculated at step S107 is subtracted from the U phase motor current value Imu, the V phase motor current value Imv, and the W phase motor current value Imw calculated at step S105. In the following, the motor current values after having been corrected of U phase, V phase, and W phase are respectively referred to as a U phase corrected motor current value Ihmu, a V phase corrected motor current value Ihmv, and a W phase corrected motor current value Ihmw.

$$Ihmu = Imu - Iho \qquad (5)$$

$$Ihmv = Imv - Iho \qquad (6)$$

$$Ihmw = Imw - Iho \qquad (7)$$

Further, a motor current value correcting unit is realized by the step S109.

At step S111, the offset correction values Iou, Iov, Iow of the respective phases are updated. The correction value Iho equated at step S107 is the offset varying value of the current detecting circuits 41 through 43 provided at the respective phases and therefore, as shown by the following equations (8) through (10), the U phase offset correction value Iou, the V phase offset correction value Iov, and the W phase offset correction value Iow are respectively added with the correction value Iho calculated at step S107.

$$Iou \leftarrow Iou + Iho \qquad (8)$$

$$Iov \leftarrow Iov + Iho \qquad (9)$$

$$Iow \leftarrow Iow + Iho \qquad (10)$$

At step S113, a motor driving processing similar to that of the related art is carried out based on the U phase corrected motor current value Ihmu, the V phase corrected motor current value Ihmv, and the W phase corrected motor current value Ihmw provided by the above-described procedure. Thereafter, the operation returns to step S103 and the above-described processing is repeated.

<4. Modified Example etc.>

Figure 4:
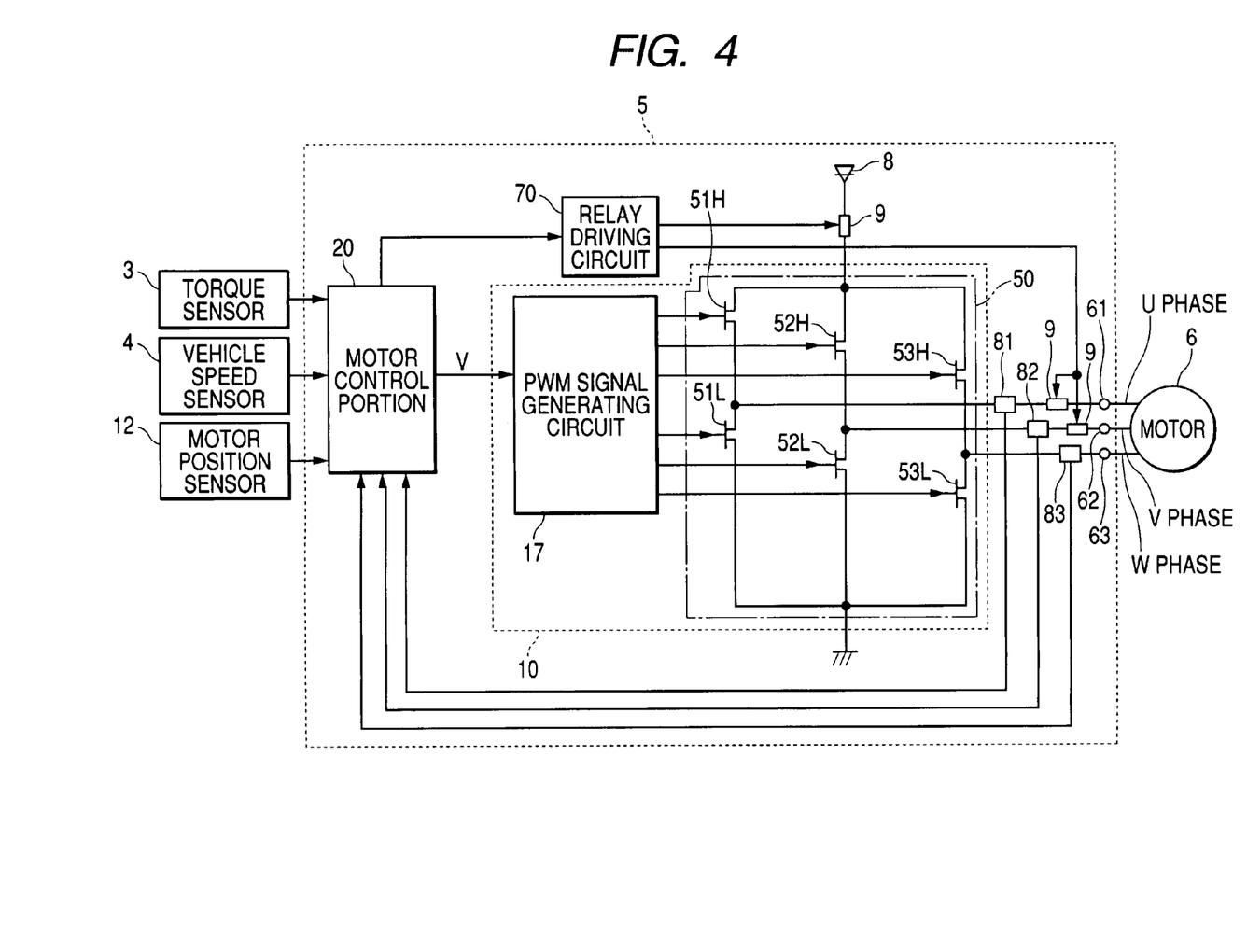
FIG. 4 is a block diagram showing a constitution of ECU which is a control apparatus of an electric power steering apparatus according to a modified example of the embodiment.

FIG. 4 is a block diagram showing a constitution of ECU 5 which is a control apparatus of an electric power steering apparatus according to a modified example of the embodiment. Although in the above-described embodiment, the current detecting circuits 41 through 43 are provided at the lower arms of the respective phases of the motor driving circuit 50, as shown by FIG. 4, the current detecting circuits 81 through 83 may be constituted to provide between the motor driving circuit 50 and the motor 6. Although in the constitution, currents are detected by the current detecting circuits in all the phases and therefore, the motor current value is correctly calculated by a procedure similar to that of the embodiment.

Further, although according to the embodiment, an explanation has been given by taking an example of the brushless motor of 3 phases, a number of phases of the brushless motor of the invention is not limited to 3 phases. By providing the current detecting circuits to respective phases of the motor 6, the invention is applicable to an electric power steering apparatus using the brushless motor of a plurality of phases of 4 or more phases. In this case, correction values for correcting motor current values of respective phases are calculated by dividing a sum of the motor current values of all the phases of the brushless motor by a number of phases of the brushless motor.

<5. Effect>

As described above, in the electric power steering apparatus according to the embodiment, the current detecting circuits are provided to all the phases of the brushless motor and values of the motor currents flowing in the respective phases are detected. Further, by dividing the sum of the values of the currents flowing in the respective phases by a number of phases of the brushless motor, the offset varying value is calculated as the correction value. Further, the motor current value is corrected by subtracting the correction value from the motor current value. Thereby, even when the offset value of the phase current detected value detected by the current detecting circuit is varied by an influence of a change in temperature or the like in operating the electric power steering apparatus, the motor current value is correctly calculated for all of the phases. Further, the motor is driven based on the correctly calculated motor current value and therefore, the torque ripple is restrained from being brought about. Therefore, the driver can feel a steering feeling having no strange feeling.

What is claimed is:

1. An electric power steering apparatus for applying a steering assisting force to a steering mechanism of a vehicle by driving a brushless motor in accordance with a steering torque applied to an operating unit for steering the vehicle, the electric power steering apparatus comprising:
   motor current detecting units provided at respective phases of the brushless motor, which detect values of motor currents flowing in the respective phases of the brushless motor and output detecting signals indicating the motor current values, respectively;
   a correction value calculating unit that calculates a correction value for correcting the motor current values provided based on the detecting signals by dividing a sum of the motor current values of all the phases of the brushless motor by a number of the phases of the brushless motor;
   a motor current value correcting unit that corrects the motor current values based on the correction value; and
   a motor driving unit that drives the brushless motor based on the motor current values corrected by the motor current value correcting unit.

2. A method of driving a brushless motor in accordance with a steering torque applied to an operating unit for steering a vehicle to apply a steering assisting force to a steering mechanism of the vehicle, said method comprising the steps of:
   detecting values of motor currents flowing in respective phases of the brushless motor;
   calculating a correction value for correcting the motor current values provided based on a result of the detecting step by dividing a sum of the motor current values of all the phases of the brushless motor by a number of the phases of the brushless motor;
   correcting the motor current values based on the correction value; and
   driving the brushless motor based on the corrected motor current values.

* * * * *